United States Patent [19]
VanGinhoven et al.

[11] Patent Number: 4,825,495
[45] Date of Patent: May 2, 1989

[54] LEAF LOADING MACHINE WITH COOPERATING SHROUD AND HOUSING

[75] Inventors: Robert M. VanGinhoven, Lancaster; John B. Crego, New Holland; Ronald T. Sheehan, Lancaster, all of Pa.

[73] Assignee: Ford New Holland, Inc., New Holland, Pa.

[21] Appl. No.: 228,424

[22] Filed: Aug. 5, 1988

Related U.S. Application Data

[62] Division of Ser. No. 111,468, Oct. 22, 1987, Pat. No. 4,771,504.

[51] Int. Cl.$^4$ ............................................. E01H 1/04
[52] U.S. Cl. ............................................. 15/5; 15/83; 15/348; 56/328.1; 56/364
[58] Field of Search ............ 15/4, 5, 83, 84, 348, 15/349, 366, 384; 56/328.1, 364

[56] References Cited

U.S. PATENT DOCUMENTS

| | | | |
|---|---|---|---|
| 2,505,576 | 4/1950 | Reitan | 15/83 X |
| 2,928,225 | 3/1960 | Spencer | 15/84 X |
| 3,183,653 | 5/1965 | Cromwell | 56/12.7 |
| 3,184,777 | 5/1965 | Norden | 15/340 |
| 3,201,819 | 8/1965 | Wilgus | 15/349 |
| 3,222,706 | 12/1965 | Kaar et al. | 15/83 X |
| 3,229,320 | 1/1966 | Cymara | 15/348 |
| 3,409,933 | 11/1968 | Lavsson | 15/384 X |
| 3,747,313 | 7/1973 | Denzin | 15/83 X |
| 3,797,216 | 3/1974 | Resetich | 56/364 |
| 3,872,657 | 3/1975 | Ramacher et al. | 56/328.1 |
| 3,922,744 | 12/1975 | Doering | 15/83 |
| 3,990,125 | 11/1976 | Salia | 15/83 X |
| 3,993,141 | 11/1976 | Donohue | 56/328.1 X |
| 4,197,607 | 4/1980 | Whitson | 15/4 |
| 4,393,537 | 7/1983 | Reprogle et al. | 15/348 |
| 4,480,349 | 11/1984 | Barr | 15/4 |
| 4,550,465 | 11/1985 | Chrisley | 15/84 |
| 4,624,026 | 11/1986 | Olson et al. | 15/83 X |

FOREIGN PATENT DOCUMENTS

| | | | |
|---|---|---|---|
| 41428 | 11/1887 | Fed. Rep. of Germany | 15/83 |
| 1017760 | 5/1983 | U.S.S.R. | 15/83 |

*Primary Examiner*—Chris K. Moore
*Attorney, Agent, or Firm*—Darrell F. Marquette; Frank A. Seemar; Larry W. Miller

[57] ABSTRACT

A leaf loading machine has a rotary beater and a rotary broom extending transversely of a mobile frame. The broom is disposed rearwardly of and in tandem relation to the beater. The beater and the broom have lower sides thereof disposed adjacent the ground and they are operable to counterrotate relative to one another so as to deliver material from the ground upwardly therebetween. A shroud mounted on the frame fully covers an upper side of the beater and partially covers an upper side of the broom. The shroud is open at its front and rear ends, and includes a top wall and a pair of side walls. A housing is also mounted on the frame overlying and enclosing the broom and an auger disposed rearwardly of the broom. The housing is closed at its rear end but is open at its front end where it communicates with the rear end of the shroud to guide material delivered between the beater and the broom to the auger. The housing includes a top wall, a pair of side walls, and a rear wall.

17 Claims, 7 Drawing Sheets

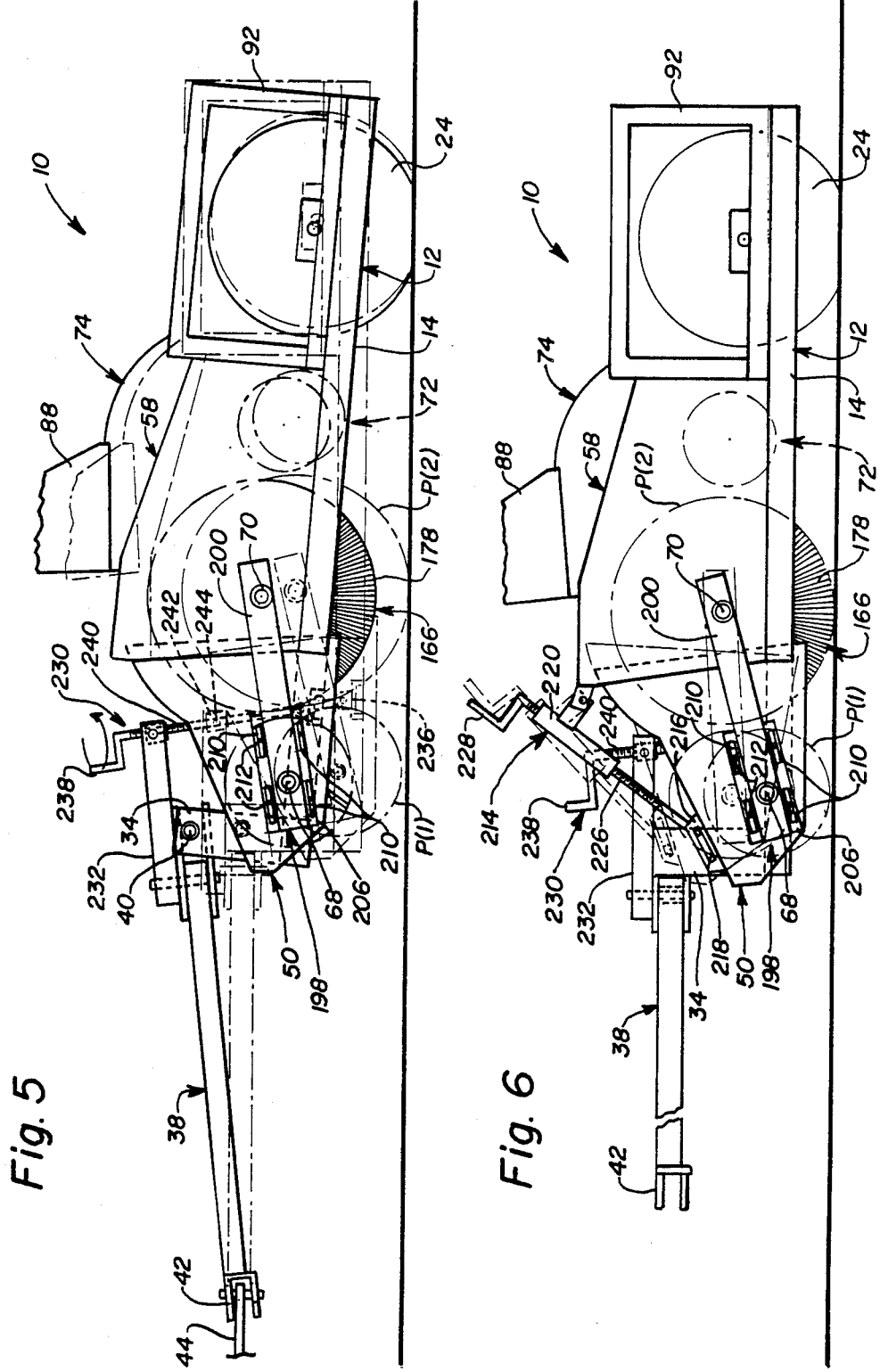

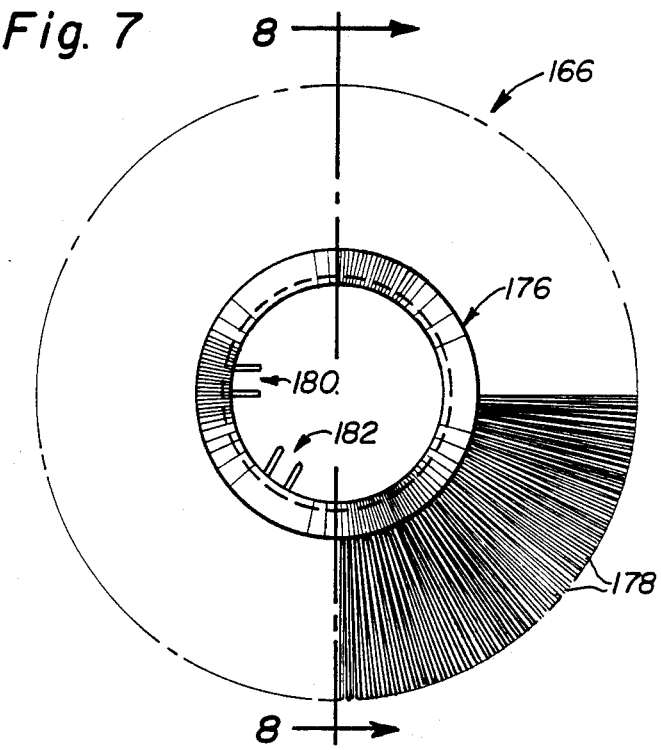
Fig. 7
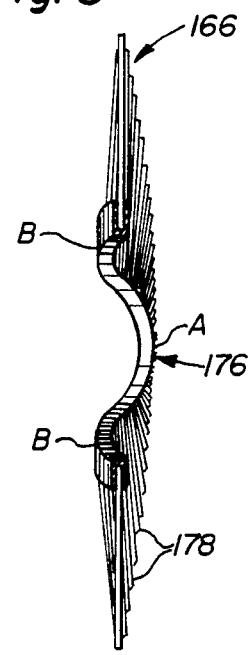
Fig. 8
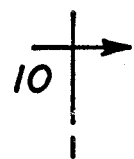
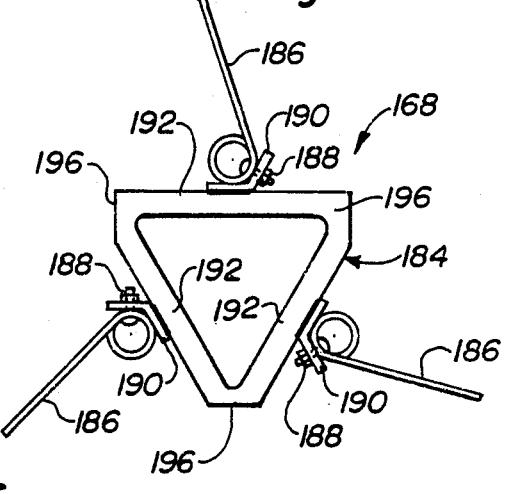
Fig. 9
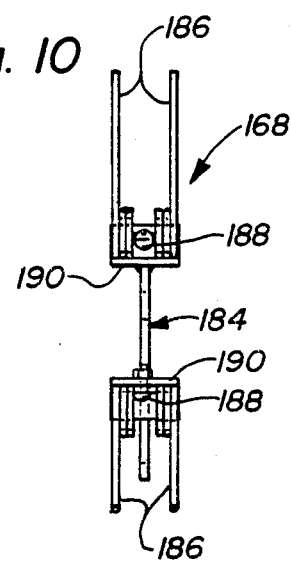
Fig. 10

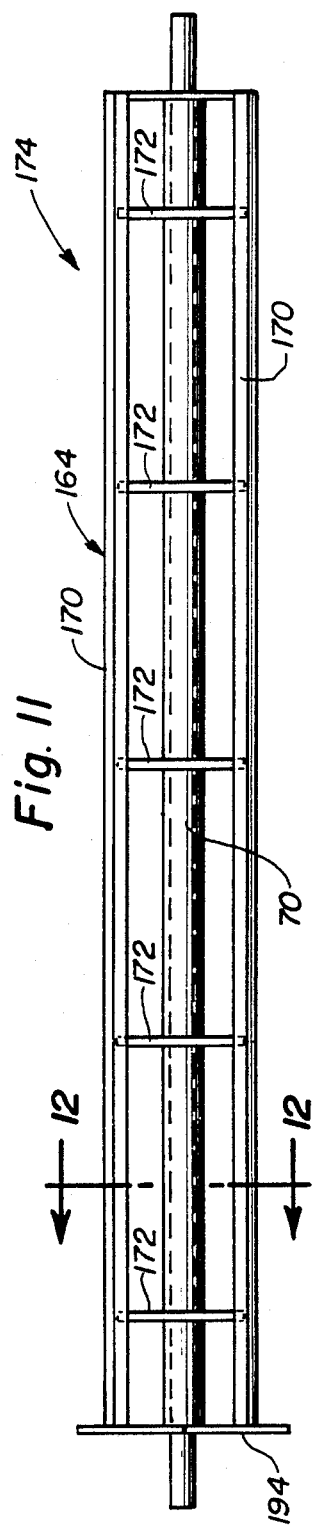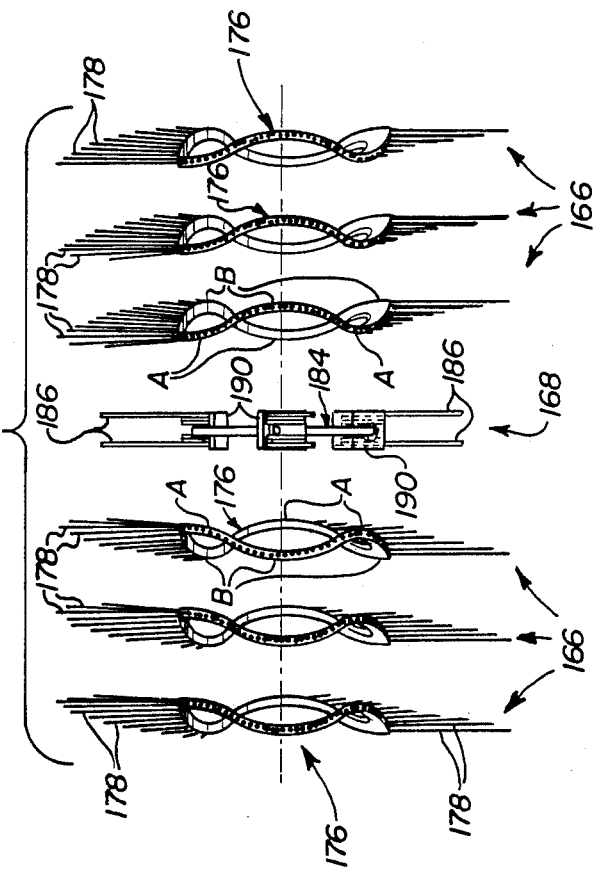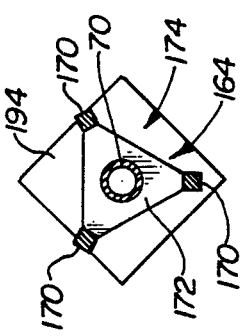

LEAF LOADING MACHINE WITH COOPERATING SHROUD AND HOUSING

BACKGROUND OF THE INVENTION

This is a division of U.S. patent application Ser. No. 111,468, filed Oct. 22, 1987, now U.S. Pat. No. 4,771,504, issued Sept. 20, 1988.

FIELD OF THE INVENTION

The present invention relates generally to loading machines and, more particularly, is concerned with an improved leaf loading machine capable of sweeping and picking up leaves under diverse and adverse conditions.

DESCRIPTION OF THE PRIOR ART

Various machines for sweeping and removing leaves, trash and debris from municipal streets, roads, parks and other surfaces are in wide use at the present time. Representative of the prior art are the sweepers and collectors disclosed in U.S. Pat. Nos. to Cromwell (3,183,653), Doering (3,922,744), Saiia (3,990,125), Donohue (3,993,141), and Olson et al (4,624,026) and embodied in machines commercially available under the trademarks, Sweepster and Tarco, and tradename, Vanguard. Other prior art harvesting machines for picking up crop materials are disclosed in U.S. Pat. Nos. to Resetich (3,797,216) and Ramacher et al (3,872,657).

Many prior art sweepers and collectors operate satisfactorily when the prevailing conditions are close to ideal, such as where the leaves and other debris are dry and lie in loose and scattered arrangements on a surface. However, when adverse weather produces less than ideal conditions, such as where leaves and other debris becomes wet, compacted, frozen or hard-packed, many prior art machines fail to do an adequate job of sweeping and removing the materials.

One major shortcoming of many prior art machines lies in the inability of their sweeping rotors vacuums and brooms to perform the multiplicity of functions required to handle the diversity of adverse conditions typically encountered, such as mentioned above. While the brooms may be adequate to sweep the loose materials, they are frequently incapable of loosening packed material. Also, while a set of tandemly-arranged brooms may be able to lift dry and fluffy materials, they are commonly incapable of lifting heavier and more dense clumps and piles of wet debris.

Consequently, a need exists for a leaf collecting machine of improved versatility rendering it capable of satisfactory performance under a variety of adverse conditions, such as handling removal of densely-packed piles of leaves and debris.

SUMMARY OF THE INVENTION

The present invention provides a leaf loading machine designed to satisfy the aforementioned needs. The term "leaf" is meant to cover not only leaves, but also other materials and debris commonly encountered on streets, roads and park surfaces.

The present invention provides an improved machine which functions to effectively sweep and pick up or lift material such as leaves lying in a variety of conditions on a variety of surfaces. The machine functions satisfactorily under a wide range of adverse conditions, for instances where the leaves are matted and frozen and where stones, bottles and cans are intermixed with the leaves. Thus, the machine is capable of handling everything from wet, hard packed, or dry and fluffy, leaves to small junk.

The leaf loading machine of the present invention comprises a mobile frame, a rotary beater extending transversely of the frame and including a plurality of lifting elements, a rotary broom extending transversely of the frame and including a plurality of bristles, and an auger extending transversely of the frame for receiving leaves from the broom. The broom is disposed rearwardly of and in tandem relationship to the beater. The beater and the broom each have a lower side thereof disposed adjacent the ground and are operable to counterrotate relative to one another to deliver material from the ground upwardly between the beater and the broom. The machine also comprises a shroud mounted on the frame covering an upper side of the beater and partially covering an upper side of the broom. The shroud is open at its front and rear ends. The machine further comprises a housing mounted on the frame overlying and enclosing part of the upper side of the broom and an upper side of the auger. The housing is open at its front end and closed at its rear end. The front end of the housing communicates with the rear end of the shroud to guide material delivered between the beater and the broom toward the auger. The machine may also comprise a thrower mounted on the frame for receiving material from the auger and for discharging the material.

In the preferred embodiment of the leaf loading machine of the present invention, the shroud includes a top wall and a pair of side walls while the housing includes a top wall, a pair of side walls, and a rear wall. The housing is arranged so that the spacing between the housing top wall and the upper side of the broom adjacent the front end of the housing is substantially less than the spacing between the housing top wall and the upper side of the auger adjacent the rear end of the housing. One of the housing side walls includes an opening for providing communication between the auger and the thrower, and a trough extends between the housing side walls underlying the auger.

BRIEF DESCRIPTION OF THE DRAWINGS

In the course of the following detailed description, reference will be made to the attached drawings in which:

FIG. 5 is a left side elevational view of the leaf loading machine with the machine being shown in a transport position in solid line form and an operating position in dashed line form;

FIG. 6 is a left side elevational view of the leaf loading machine with its rotary pickup beater being shown at its minimum displacement above the ground in solid line form and at its maximum displacement above the ground in dashed line form;

FIG. 7 is an enlarged side elevational view of one of the sweeping elements in a rotary pickup broom of the leaf loading machine;

FIG. 8 is a sectional view taken along line 8—8 of FIG. 7;

FIG. 9 is an enlarged side elevational view of one of the lifting elements in the pickup broom of the leaf loading machine;

FIG. 10 is an end elevational view as seen along line 10—10 of FIG 9;

FIG. 11 is an enlarged side elevational view of a central spider support structure in the pickup broom of the leaf loading machine;

FIG. 12 is a sectional view taken along line 12—12 of FIG. 11; and

FIG. 13 is an exploded view of one of ten groupings of sweeping and lifting elements in the pickup broom of the leaf harvesting machine.

DETAILED DESCRIPTION OF THE INVENTION

In the following description, right hand and left hand references are determined by standing at the rear of the machine and facing in the direction of forward travel. Also in the following description, it is to be understood that such terms as "forward", "left", "upwardly", etc., are words of convenience and are not to be construed as limiting terms.

In General

Figure 1:
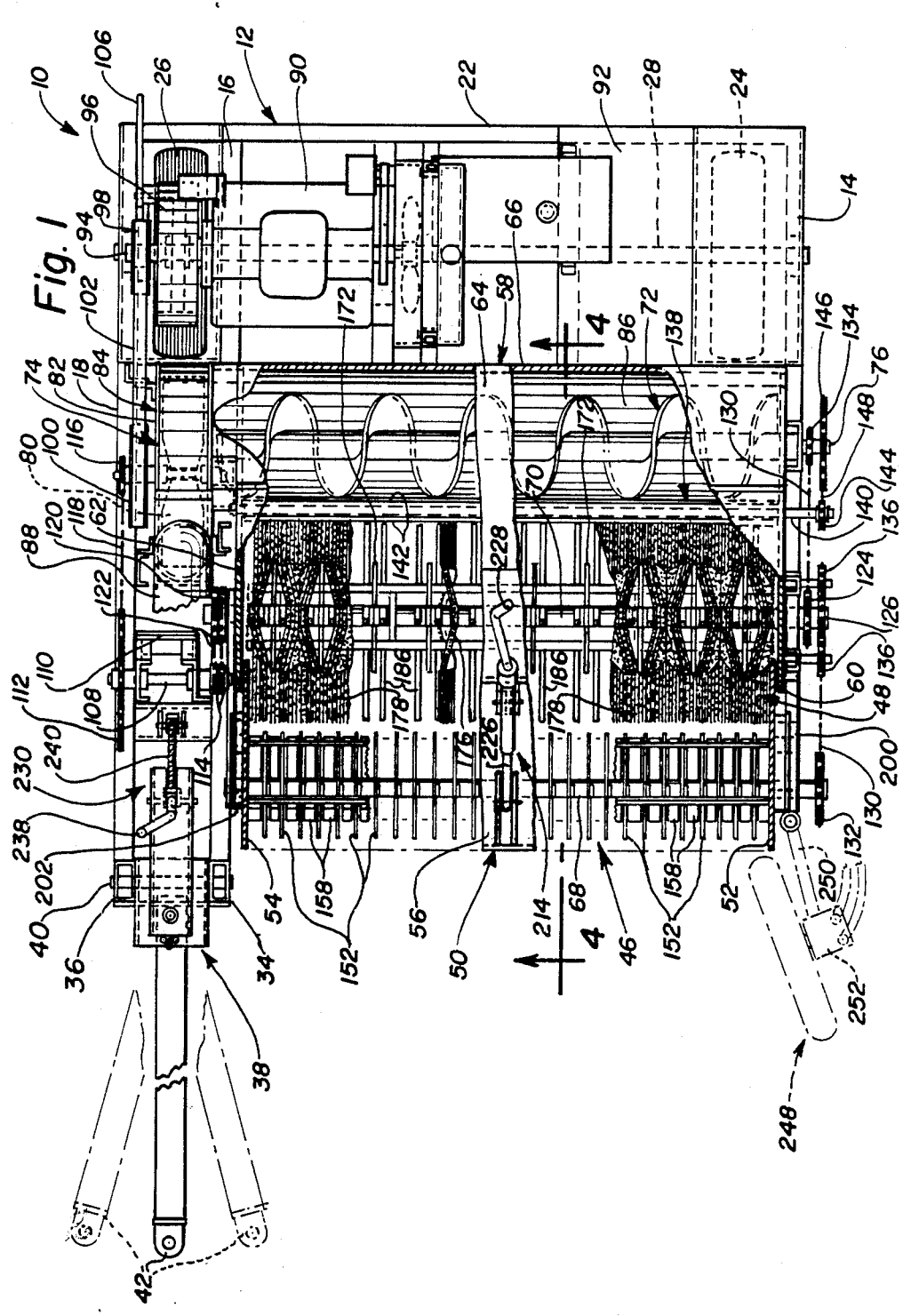
FIG. 1 is a top plan view, with portions broken away, of a leaf loading machine embodying the principles of the present invention.
Figure 2:
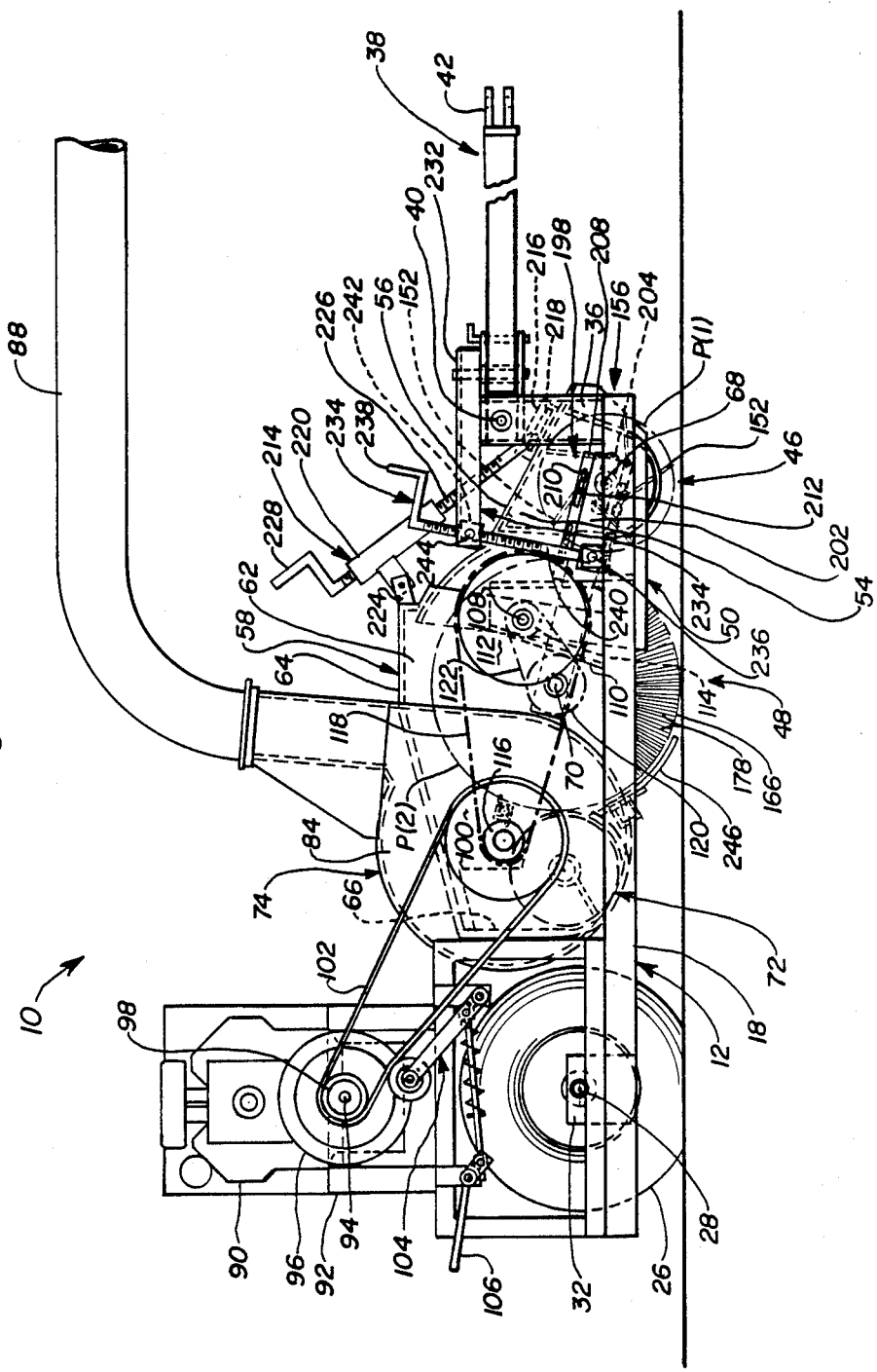
FIG. 2 is a right side elevational view of the machine of FIG. 1.
Figure 3:
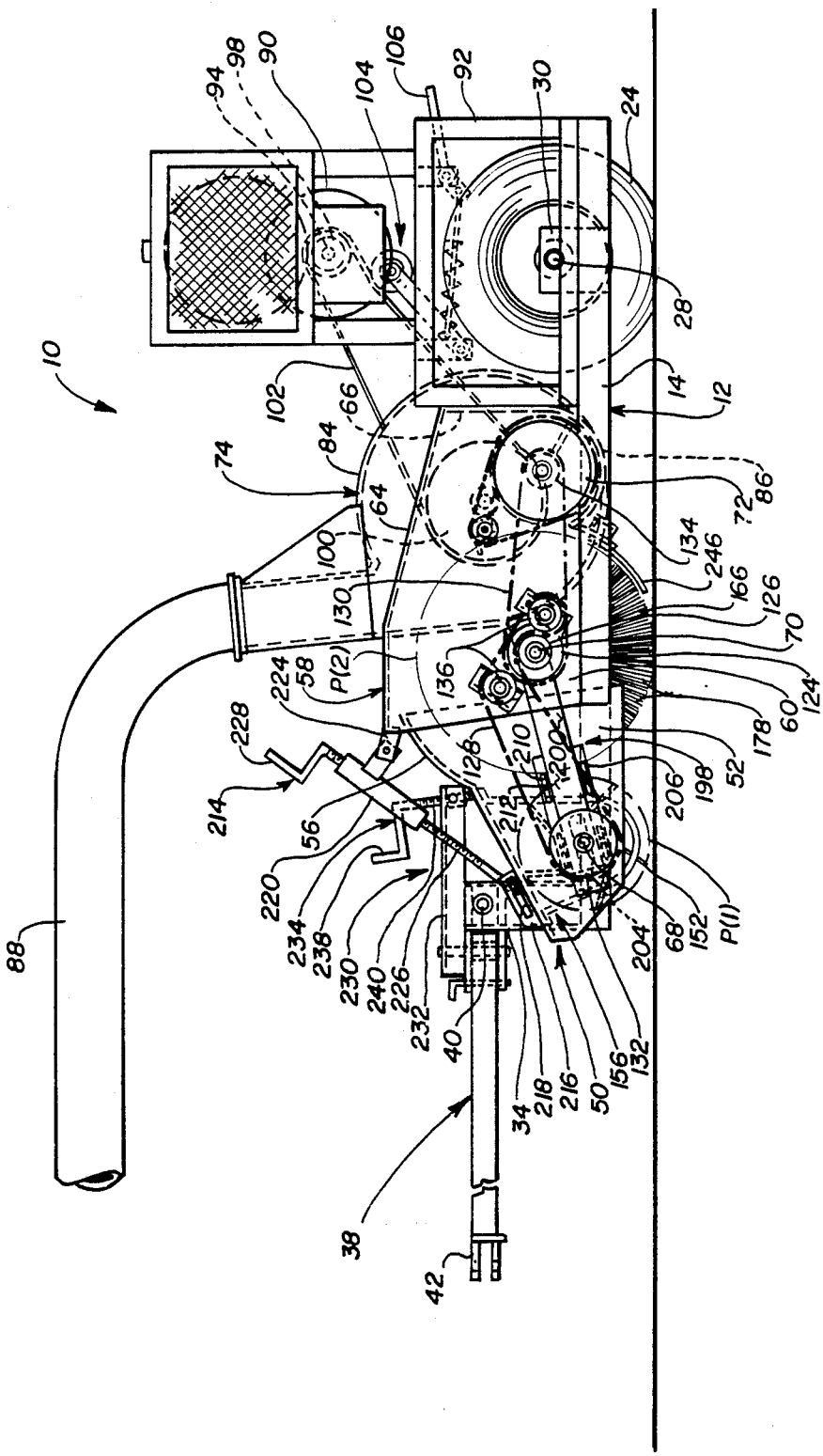
FIG. 3 is a left side elevational view of the machine of FIG. 1.

Referring now to the drawings, and particularly to FIGS. 1-3, there is shown an improved leaf loading machine, being indicated generally by numeral 10 and comprising the preferred embodiment of the present invention (the right side of the machine being shown in FIG. 2 and the left side in FIG. 3 when one is standing to the rear of the machine and facing in the direction of forward travel).

The machine 10 is provided with a mobile frame, generally indicated at 12, which includes a left longitudinal frame member 14 and a pair of laterally spaced inner and outer right longitudinal frame members 16,18 which members 14,16,18 all extend fore-and-aft and are interconnected by forward and rearward transverse frame members 20,22. The longitudinal frame members 14,16,18 are respectively supported by left and right ground wheels 24,26 being rotatably mounted by an elongated axle 28 extending between and mounted at its opposite ends to left and right bracket plates 30,32 fixed in upright orientations to the rear portions of the left and outer right longitudinal members 14,18.

At the right front portion of the mobile frame 12, a pair of inner and outer beams 34,36 are fixed upstanding on the front ends of respective inner and outer longitudinal frame members 16,18. A tongue assembly 38 is pivotally mounted at its rear portion by an elongated pivot pin 40 connected to and extending between the upper ends of the beams 34,36. The tongue assembly 38 extends forward from the beams 34,36 and has a hitching means 42 on its forward end adapting the machine 10 to be secured to a drawbar 44 (FIG. 5) of a towing vehicle (not shown), such as a truck located at the front of the machine 10, for towing the machine 10 along surfaces of streets, roadways, parks or other areas to be cleaned.

In addition to the mobile frame 12, the leaf loading machine 10 basically includes a rotary beater 46 on the frame 12 extending transversely of the direction of travel and a main rotary pickup broom 48 on the frame 12 also extending transversely of the direction of travel and disposed rearwardly of and in tandem relation to the beater 46. Covering the upper side of the beater 46 is a shroud 50 open at its front and rear ends and composed of a pair of spaced left and right side walls 52,54 interconnected by a top wall 56. Overlying and enclosing the upper side of the main pickup broom 48 is a housing 58 open at its front end and composed of a pair of spaced left and right side walls 60,62 interconnected by a top wall 64 and closed at the rear end of the housing 58 by a rear wall 66. The housing 58 is fixed on and extends between and above the left and inner right longitudinal frame members 14,16 of the mobile frame 12.

Thus, the beater 46 and main pickup broom 48 are disposed with their lower sides adjacent to the ground and their upper sides spaced below respective top walls 56,64 of the shroud and housing 50,58. The auxiliary beater 46 and main broom 48 have respective elongated central tubular members 68 and 70 rotatably mounted at their respective opposite ends to and extending between respective side walls 52,54 and 60,62 of the shroud 50 and housing 58 by which the beater 46 and broom 48 can counterrotate relative to one another so as to deliver leaves from the ground upwardly therebetween. The leaves are then deflected rearwardly over the main broom 48 by the respective top walls 56 and 64 of the shroud 50 and housing 58.

Also, the leaf loading machine 10 includes means on the mobile frame 12 for receiving the leaves delivered from the ground by the beater 46 and main pickup broom 48 and deflected rearwardly over the broom 48 toward the rear wall 66 of the housing 58. The receiving means preferably takes the form of a transfer auger 72 disposed transversly on the mobile frame 12 rearwardly of and in tandem with the broom 48 and a discharge blower 74 coaxially aligned with and disposed at a discharge end of a central shaft 76 of the auger 72. The auger 72 at the left end of its shaft 76 is rotatably mounted to the left side wall 60 of the housing 58. The thrower 74 is mounted on the inner and outer right longitudinal frame members 16,18 adjacent the right side wall 62 of the housing 58.

An opening 78 in the housing right side wall 62 provides communication of the auger 72 with an impeller 80 rotatably mounted between the housing right side wall 62 and an outer side wall 82 of a casing 84 of the blower 74. The auger 72 rotates and coacts with a stationary arcuate shaped trough 86, which underlies the auger 72 and is fixed between the housing side and rear walls 60,62,64, to transfer the leaves laterally from left to right in FIG. 1 to the thrower impeller 80. The impeller 80 rotating at high speed in the blower casing 84 propels the leaves through the casing 84 and out a discharge spout 88 extending upwardly from the casing 84 to a storage location, such as the truck which tows the machine 10.

The motive power for the beater 46, main pickup broom 48, transfer auger 72 and discharge thrower 74 of the leaf loadingmachine 10 is derived from an engine 90 mounted on a rear superstructure 92 fixed to the longitudinal frame members 14,16,18 of the mobile frame 12 and overlying the ground wheels 24,26 thereof. A power train leading from a rotating drive shaft 94 of the engine which mounts a flywheel 96 provides rotary driving power to the above-described operating components of the machine 10.

More particularly, the power train includes drive and driven sheaves 98,100 respectively mounted on the engine drive shaft 94 and the thrower impeller 80 and a continuous belt 102 extending between an drivingly entrained about the sheaves 98,100. A belt tightener mechanism 104 is disposed adjacent the belt 102 and actuatable by a handle 106 pivotally mounted on the superstructure 92. The power train also includes a jack shaft 108 rotatably mounted a bracket 110 fixed upright on the outer right longitudinal frame member 18 and having a large diameter sprocket 112 and a pair of small diameter sprockets 114 attached respectively on outer and inner ends of the jack shaft 108. Another small diameter sprocket 116 is attached on the outer end of the impeller 80 adjacent the sheave 110 thereon with a drive chain 118 extending between and drivingly entrained about the sprockets 112,116.

For powering the main pickup broom, the dual sprockets 114 on the inner end of the jack shaft 108 are drivingly coupled to dual sprockets 120 on the right end of the broom central tubular member 70 by a pair of continuous drive chains 122. For powering the beater 46 and the transfer auger 72, a pair of inner and outer sprockets 124,126 are attached side-by-side to the left end of the broom central tubular member 70. Respective drive chains 128,130 extend between and drivingly couple the outer and inner sprockets 126,124 with sprockets 132,134 respectively attached on the left ends of the beater central tubular member 68 and the auger shaft 76. A pair of drive chain take-up idler sprockets 136 are rotatably mounted on the left side wall 60 of the housing 58 adjacent the outer sprocket 126 on the broom central tubular member 70. The idler sprockets 136 allow adjustable movement of the beater 46 toward and away from the broom 48 while still providing drive coupling therebetween by the chain 128 and also provide for counterrotation of the beater 46 and broom 48 such that they move toward one another, as depicted by the arrows in FIG. 4, at their respective lower sides.

The machine 10 also has a brush stripper 138 with an elongated shaft 140 and diametrically opposed radially projecting combs 142. The shaft 140 is rotatably mounted between the left and right housing side walls 60,62 so as to locate its combs 142 rearwardly and tangentially to the main pickup broom 48. The power train also includes a large diameter sprocket 144 attached on the left end of the auger shaft 76 and a small diameter sprocket 146 attached to the left end of the brush stripper shaft 140. A drive chain 148 extends between and drivingly couples the sprockets 144,146. The relative speeds of the operating components of the machine 10 can readily be determined by comparing the relative sizes of the respective sheaves and sprockets of the power train associated therewith.

Rotary Beater and Pickup Broom

Figure 4:
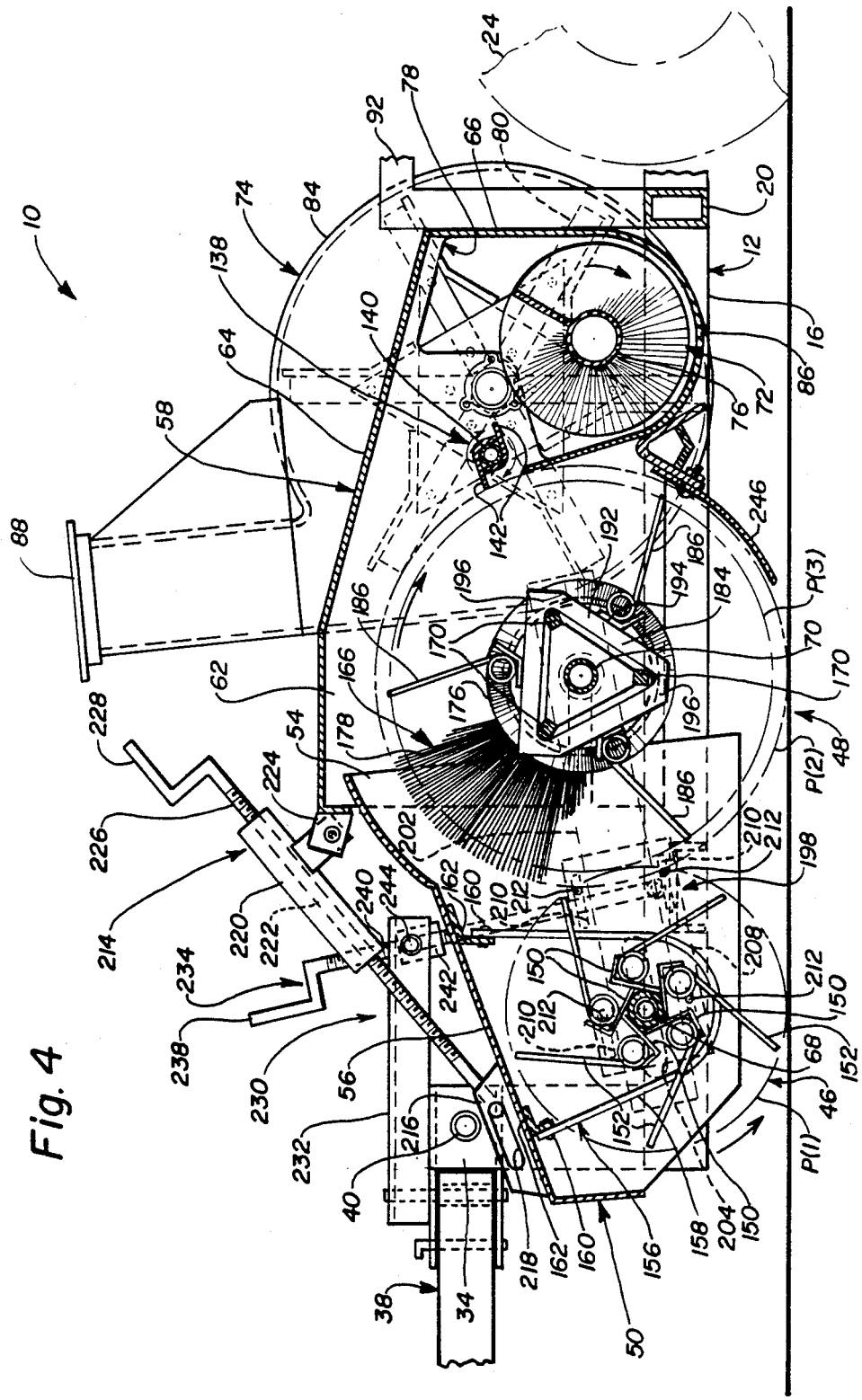
FIG. 4 is an enlarged sectional view taken along line 4—4 of FIG. 1.

One important feature of the improved leaf harvesting machine 10 relates to the composition of, and cooperation which occurs between, the beater 46 and main pickup broom 48. As best seen in FIG. 4, in addition to its central tubular member 68, the pickup beater 46 includes a number of elongated angle members 150 being L-shaped in cross section and a plurality of elongated lifting elements 152 attached in spaced relation along each of the angle members 150. The angle members 150 are circumferentially spaced about and rigidly fixed to the central tubular member 68 so as to extend tangentially therefrom. The lifting elements 152 are angularly spaced about and generally extend in swept back radial fashion from a central mounting structure 154 formed by the angle members 150 and central tubular member 68 of the beater.

Also, the beater 46 includes a stripper assembly 156 composed of a plurality of spaced apart U-shaped stripper segments 158 which extend parallel to one another and downwardly around the lower side of the central mounting structure 154 and are attached at their upper ends by bolts 160 to flanges 162 fixed on the underside of the top wall 56 of the beater shroud 50. The lifting elements 152 are aligned with the spaces between the stripper segments 158 so as to extend through the spaces and beyond the stripper segments 158 during travel through the lower portion of an endless path of travel P(1) as the beater central mounting structure 154 is rotated counterclockwise as viewed in FIG. 4. During travel through the upper portion of the endless path P(1), the lifting elements 152 withdraw inside of the stripper segments 158 whereby the segments 158 cause stripping of any material clinging to the lifting elements 152. Preferably, the lifting elements 152 take the form of resiliently yieldable, semi-rigid spring type fingers or tines which move in the endless path P(1) and are capable of engaging and loosening up densely packed piles of leaves and of lifting the leaves upwardly from the ground.

As best seen in FIGS. 1, 4, and 7-13, in addition to its central tubular member 70, the pickup broom 48 includes a spider 164, and pluralities of brushing or sweeping elements 166 and lifting elements 168 axially slidably mounted on the spider 164. The spider 164 is composed of three bars 170 spaced radially from and extending generally parallel to the central tubular member 70 by a plurality of triangular-shaped plates 172. The plates 172 are axially spaced from one another along the central tubular member 70 and attached thereto and to the bars 170 so as to define with the central tubular member 70 and bars 170 a central spider support structure 174 having an overall equilateral triangular configuration.

As best seen in FIGS. 4, 7, 8 and 13, each of the brushing or sweeping elements 166 of the broom 48 is composed of a central ring 176 having a multiplicity of resiliently flexible elongated fiber bristles 178 arranged in a row, anchored thereto and extending radially therefrom. The central ring 176 has a wavy, undulating or convoluted shape defining three pairs of alternating, axially spaced lobes A and B which, depending upon the angular orientation of one ring 176 relative to an adjacently positioned ring 176, allow placement of the rings 176 either in sync or out of sync with one another. In other words, when the rings are "in sync" with one another, the three pairs (or six) lobes A,B of each ring are nested together in close packed contacting relation with their rows of bristles 178 disposed adjacent one another. After rotation of one ring 176 sixty degrees relative to the adjacent ring 176, the rings are "out of sync" such that only three lobes A displaced one hundred twenty degrees apart are contacting and their rows of bristles 178 are axially spaced at the locations of the other three spaced apart lobes. Both the "in sync" and "out of sync" relationships of the sweeping elements 166 can be seen in FIG. 1. Two pairs of radially inwardly extending spaced drive pins 180, 182 fixed on the ring 176 of each sweeping element 166 and circumferentially spaced from one another by approximately one inch interfit with any of the bars 170 of the spider support structure 174 to prevent the sweeping element 166 from rotating relative thereto once the ring 176 has been slidably installed over the spider support structure 174. Rotation of the spider support structure 174 thus causes rotation of the plurality of sweeping elements 166 therewith in an endless path P(2) in which the outer tips of the fiber bristles 178 engage and sweep the loosened leaves across the ground.

As best seen in FIGS. 4, 9, 10 and 13, each of the lifting elements 168 of the broom 48 is composed of a triangular shaped plate 184 and a plurality of resiliently-yieldable, semi rigid spring type fingers or tines 186 angularly-spaced thereabout one hundred twenty degrees from one another. The tines 186 are mounted by bolts 188 to each of three angular brackets 190 fixed on the respective three segments 192 of the plate 184. Installation of the lifting element 168 over the spider support structure 174 of the broom 48, as best seen in FIG. 4, involves aligning the bars 170 of the spider support structure 174 with the interior corners formed by the plate segments 192 and then sliding the plate 184 on the bars 170.

As shown in FIG. 13, one lifting element 168 is grouped with six sweeping elements 166 with a subgroup of three sweeping elements 166 on each opposite side of the lifting element 168. Ten of such groups are positioned along the spider support structure 174 of the broom 48. The sweeping and lifting elements 166,168 are installed from the right end of the structure 174 as viewed in FIG. 11. A stop plate 194 is provided on the left end of the structure 174.

The three sweeping elements 166 of each subgroup on each side of the lifting element 168 are oriented to assume an "in sync" or nesting relation to one another. However, the inner ones of the sweeping elements 166 of the two subgroups are oriented "out of sync" with each other, allowing the lifting element 168 to be positioned therebetween with its corners 196 formed by the plate segments 192 being disposed between the three spaced lobes B of the sweeping element rings 176. In such manner, the lifting element tines 186 are interspersed with the fiber bristles 178 of the sweeping elements 166 and, upon rotation of the spider support structure 174, move in an endless path P(3) to engage and lift upwardly from the ground the leaves being swept by the sweeping elements 166. It will be observed in FIG. 4 that the tines 186 of the lifting elements 168 are slightly shorter in length than the bristles 178 of the sweeping elements 166. Thus, the diameter of endless path P(3) is less than that of endless path P(2).

Therefore, upon counterrotation of the beater 46 and main pickup broom 48 such that the beater and broom rotate toward one another at their respective lower sides which are located adjacent the ground, the respective sweeping elements 166 and lifting elements 152,168 thereof cooperate to positively and consistently deliver leaves from the ground upwardly between the beater and broom 46,48 to the transfer auger 72. Because of the interspersed relationship of the tines 186 within the mass of bristles 178, when the load becomes heavy the more rigid tines 186 take over the load carrying function from the fiber bristles 178. If the tines 186 were not present, the bristles 178 would merely deflect and not lift the load. The tines 186 by being spring-type are forgiving and so will resilient yield when passing over rocks and other immovable objects.

Adjustable Mounting of Rotary Beater

Another important feature of the improved leaf harvesting machine 10 relates to means mounted on the mobile frame 12 which, in turn, adjustably mounts the beater 46 for movement along a linear path toward and away from the main pickup broom 48 for presetting the positional relationship of the beater 46 relative to the broom 48. More specifically, the adjusting means includes a releasable and slidably adjustable attachment arrangement, generally designated 198, for presetting the position of the endless path P(1) of the beater lifting elements 152 relative to the endless paths P(2),P(3) of the pickup broom sweeping and lifting elements 166,168. As seen in FIG. 4, the slightly overlapping relation between the peripheries of the respective endless paths P(1) and P(2) of the beater lifting elements 152 and pickup broom sweeping elements 166 is preferred. Also, a substantially tangential relation between the peripheries of the respective endless paths P(1) and P(2) of the pickup beater lifting elements 152 and pickup broom lifting elements 168 is preferred.

As best seen in FIGS. 1-6, the adjustable beater attachment arrangement 198 includes a pair of left and right elongated arms 200,202 pivotally mounted at their rear end portions to the outer left and right ends of the broom central tubular member 70 and slidably coupled via elongated slots 204 defined in their front end portions to outer left and right ends of the beater central tubular member 68. Left and right plates 206,208 are fixed to the front portions of the respective left and right arms 200,202 and extend above and below the arms. A pair of spaced slots 210 are formed in each of the plates 206,208 above and below the arms 200,202. The slots 210 receive releasable fasteners 212 which extend through holes in the left and right shroud side walls 52,54 being alignable with the respective slots 210. Thus, the position of the beater 46 relative to the broom 48 is adjusted by first unloosening the fasteners 212. Next, the beater 46 and shroud 50 therewith are slid toward the broom 48 (with the outer ends of the beater central tubular member 68 sliding along the slots 204 in arms 200,202) until the desired position is reached. Then, the fasteners 212 are retightened.

Still another important feature of the improved leaf loading machine 10 relates to means pivotally mounted on the mobile frame 12 and mounting the beater 46 for swinging movement toward and away from the ground about the main pickup broom center 48. In particular, the beater mounting means takes the form of the above-described beater support and attachment arrangement 198 which pivotally mounts the beater 46 to the axis of the broom 48 and a height adjustment mechanism 214 coupled between the beater shroud 50 and the mobile frame 12. Particularly, the height adjustment mechanism 214 includes a bracket 216 fixed on the top wall 56 of the shroud 50 having an elongated lost motion slot 218, a cylinder 220 having a central threaded bore 222 pivotally mounted by a bracket 224 fixed on the front edge of the housing top wall 64, and an elongated threaded rod 226 extending through the cylinder 220 with a handle 228 defined on the upper end thereof. The height adjustment mechanism 214 is actuatable by rotating the handle 228 to preset a minimum displacement of the beater above the ground, as seen in FIG. 6. The presence of the slot 218 permits a lost motion type pivotal movement of the beater shroud 50 and the beater 46 therewith to a maximum displacement above the ground (as seen in dashed line form in FIG. 6) to allow the beater 46 to rise up over immovable obstacles encountered on the ground.

Conversion Between Transport and Operating Positions

Yet another feature of the improved machine relates to a conversion arrangement 230 for raising and lowering the beater 46 and main pickup broom 48 between operating and transport positions shown respectively in dashed and solid line forms in FIG. 5. Specifically, as best seen in FIGS. 1-6, the tongue assembly 38 of the machine 10 which is pivotally mounted by the pin 40 about a generally horizontal axis to the upright beams 34,36 includes a lever member 232 of the conversion arrangement 230 extending rearwardly from the beams. The arrangement 230 also includes a conversion mechanism 234 coupled between the rear end of the lever member 232 and a bracket 236 attached on the right longitudinal members 16,18 of the mobile frame 12.

The handle 238 on a threaded rod 240 of the conversion mechanism 230 being threaded through a coupler 242 pivotally attached at 244 to the rear end of the lever member 232 is turned to rotate the rod 240 and causing pivoting of the tongue assembly 38 about the axis defined by pivot pin 40 and relative to the mobile frame 12 between first and second articulated conditions seen in FIG. 5. When the tongue assembly clevis 42 is attached to the drawbar 44 of a towing vehicle, selected actuation of the conversion mechanism 230 will respectively lower and raise the mobile frame 12 and the auxiliary pickup beater 46 and main pickup broom 48 mounted thereon between the operating and transport positions.

Other Features

In addition to the rotary brush cleaner 140 described earlier, the leaf loading machine 10 also incorporates an arcuate shaped carryover recovery plate or chute 246 fixed to and extending between the housing side walls 60,62 rearwardly of the lower side of the main pickup broom 48. The function of the chute 246 is to facilitate return of carried over material along the endless path P(2) of the broom 48 so that another attempt can be made at removing it from the street surface. Further, as an option a rotary curb brush 248 mounted to the beater left support arm 200 by a swing arm 250 and powered by a hydraulic motor 252 can be used on the machine 10.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A leaf loading machine comprising:
   a mobile frame;
   a rotary beater extending transversely of said frame and including a plurality of lifting elements;
   a rotary broom extending transversely of said frame and including a plurality of bristles, said broom being disposed rearwardly of and in tandem relationship to said beater;
   said beater and said broom each having a lower side thereof disposed adjacent the ground and operable to counterrotate relative to one another to deliver material from the ground upwardly between said beater and said broom;
   an auger extending transversely of said frame rearwardly of said broom for receiving material from said broom;
   a shroud mounted on said frame fully covering said beater and partially covering said broom, said shroud being open at its front and rear ends; and
   a housing mounted on said frame overlying and enclosing said broom and said auger, said housing being open at its front end and closed at its rear end.

2. The leaf loading machine of claim 1, wherein said shroud comprises a top wall and a pair of side walls.

3. The leaf loading machine of claim 2, wherein said housing comprises a top wall, a pair of side walls, and a rear wall.

4. The leaf loading machine of claim 3, further comprising a thrower mounted on said frame for receiving material from said auger and for discharging said material.

5. The leaf loading machine of claim 4, wherein one of the side walls of said housing includes an opening for providing communication between said auger and said thrower.

6. The leaf loading machine of claim 5, further comprising a trough underlying said auger and extending between the side walls of said housing.

7. The leaf loading machine of claim- 3, wherein said housing is arranged so that the spacing between the housing top wall and an upper side of said broom adjacent the front end of said housing is substantially less than the spacing between the housing top wall and an upper side of said auger adjacent the rear end of said housing.

8. The leaf loading machine of claim 1, wherein the rear end of said shroud communicates with the front end of said housing for guiding material delivered between said beater and said broom toward said auger.

9. The leaf loading machine of claim 1, further comprising means pivotally mounting said shroud on said frame so that said shroud is movable relative to said housing when said beater is adjusted upwardly and downwardly relative to the ground.

10. A leaf loading machine comprising:
    a mobile frame;
    a rotary beater extending transversely of said frame and including a plurality of lifting elements;
    a rotary broom extending transversely of said frame and including a plurality of bristles, said broom being disposed rearwardly of and in tandem relationship to said beater;
    said beater and said broom each having a lower side thereof disposed adjacent the ground and being operable to counterrotate relative to one another to deliver material from the ground upwardly between said beater and said broom;
    an auger extending transversely of said frame rearwardly of said broom for receiving material from said broom;
    a thrower mounted on said frame for receiving material from said auger and for discharging said material;
    a shroud mounted on said frame fully covering an upper side of said beater and partially covering an upper side of said broom, said shroud being open at its front and rear ends; and a housing mounted on said frame overlying and enclosing an upper side of said auger and part of the upper side of said broom, said housing being open at its front end and closed at its rear end, the front end of said housing communicating with the rear end of said shroud to guide material delivered between said beater and said broom toward said auger.

11. The leaf loading machine of claim 10, wherein said shroud comprises a top wall and a pair of side walls.

12. The leaf loading machine of claim 11, wherein said housing comprises a top wall, a pair of side walls, and a rear wall.

13. The leaf loading machine of claim 12, wherein said housing is arranged so that the spacing between the housing top wall and he upper side of said broom adjacent the front end of said housing is substantially less than the spacing between the housing top wall and the upper side of said auger adjacent the rear end of said housing.

14. The leaf loading machine of claim 13, wherein one of the side walls of said housing includes an opening for providing communication between said auger and said thrower.

15. The leaf loading machine of claim 14, further comprising a trough underlying said auger and extending between the side walls of said housing.

16. The leaf loading machine of claim 12, further comprising a plate extending between the side walls of said housing rearwardly of and adjacent the lower side of said broom for recovering material which is not transferred from said broom to said auger.

17. The leaf loading machine of claim 10, further comprising means pivotally mounting said shroud on said frame so that said shroud is movable relative to said housing when said beater is adjusted upwardly and downwardly relative to the ground.

* * * * *